THOMAS F. VINCENT.
Improvement in Combined Corn-Harvesters and Huskers.
No. 127,999. Patented June 18, 1872.
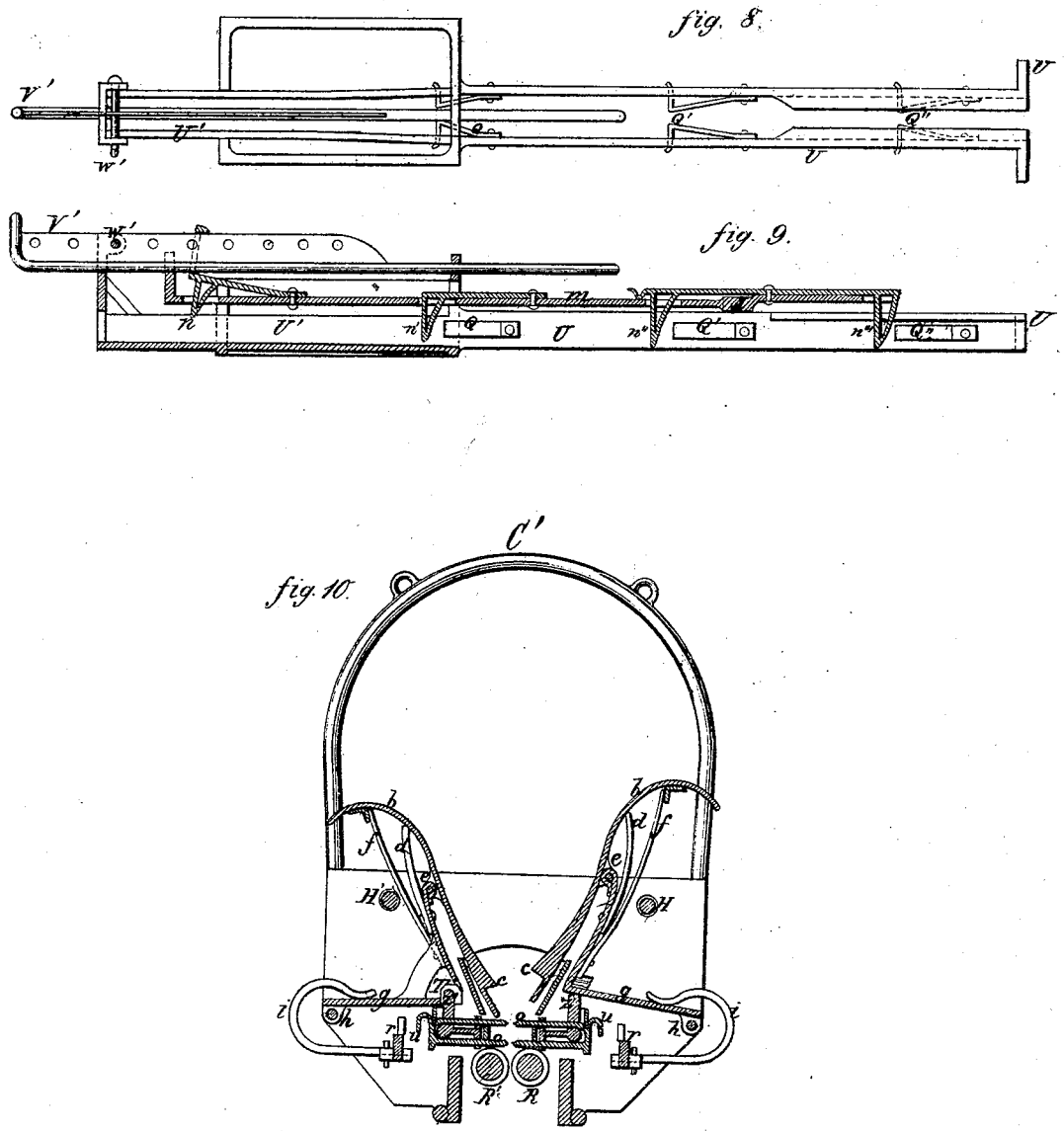

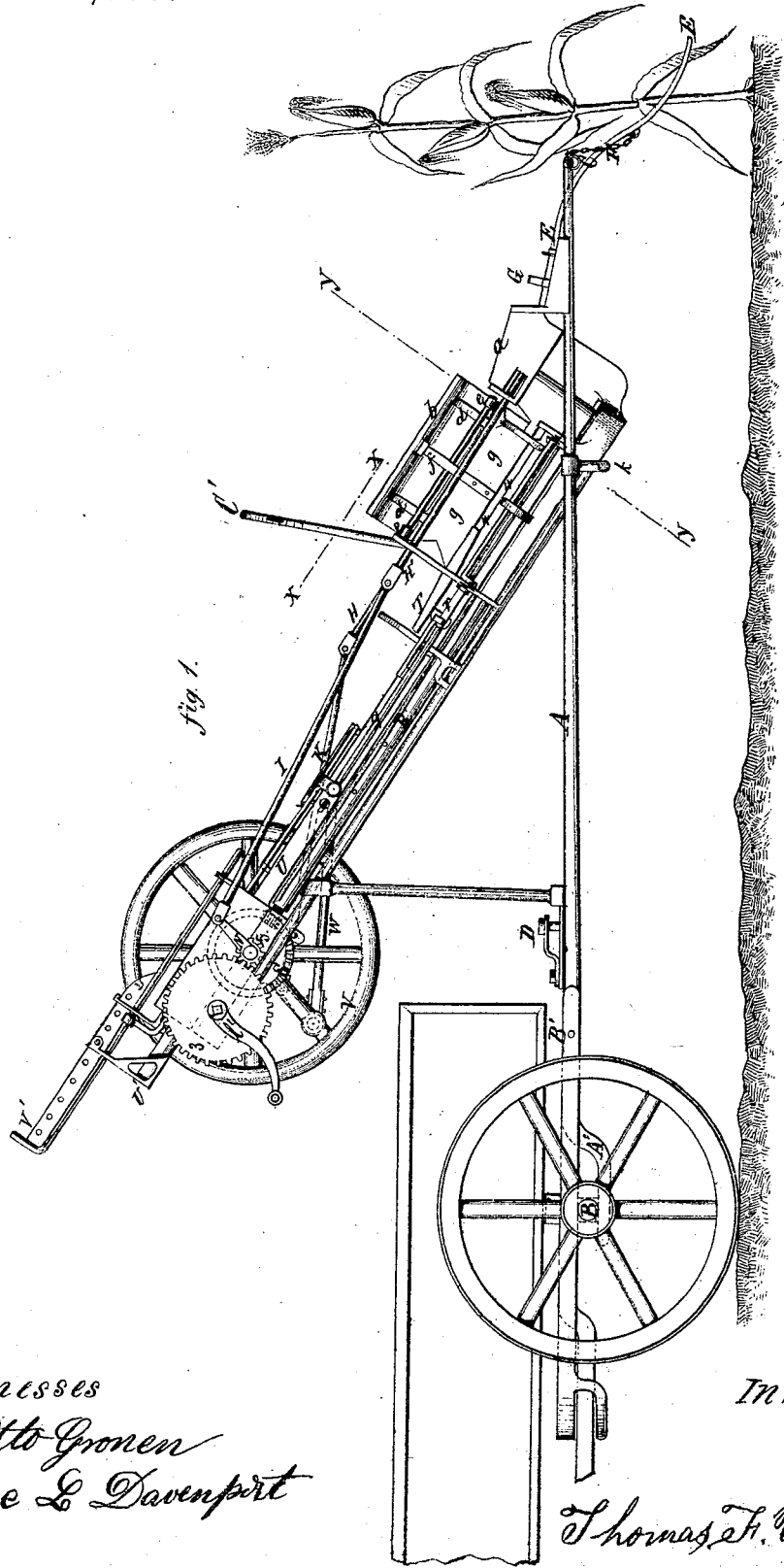

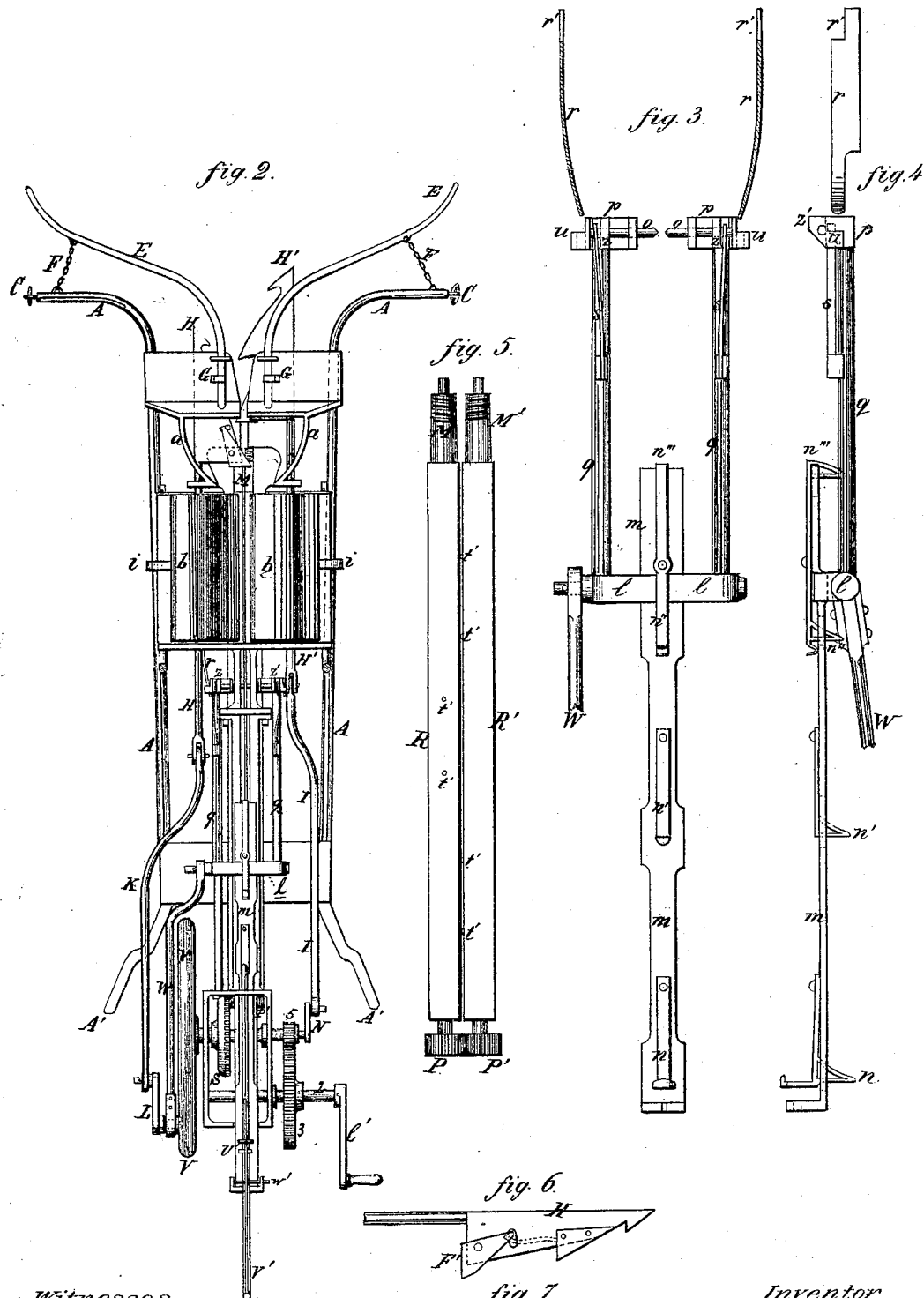

127,999

UNITED STATES PATENT OFFICE.

THOMAS F. VINCENT, OF ROCK ISLAND, ILLINOIS, ASSIGNOR OF ONE-HALF HIS RIGHT TO GEORGE BUCHMAN, OF SAME PLACE.

IMPROVEMENT IN COMBINED CORN HARVESTERS AND HUSKERS.

Specification forming part of Letters Patent No. 127,999, dated June 18, 1872.

SPECIFICATION.

I, THOMAS F. VINCENT, of the city of Rock Island, county of Rock Island, and State of Illinois, have invented certain Improvements in Field Corn-Husking Machines, of which the following is a specification:

The nature of my invention consists in attaching an apparatus to the front end of a wagon in the place of the ordinary wagon-tongue. The horses are hitched on each side of this apparatus, and, in driving over a corn-field, in such a manner that the horses walk on each side of the row of stalks. The machine first gathers the stalks; secondly, cuts off the ears; thirdly, husks the ears; and, fourthly, discharges the husked ears into the wagon.

Figure 1, Sheet 1, is a side elevation of the machine with the front part of a wagon, showing the mode of connection. Fig. 2, Sheet 2, is a plan view of the machine detached from the wagon, with the check-rein stay cut off on line $x\ x$. Fig. 3, Sheet 2, represents a top view of the rake with the rake-guides of the feeding-hopper in front of it on a larger scale. Fig. 4, Sheet 2, is a side view of Fig. 3 on an enlarged scale. Fig. 5, Sheet 2, is a bottom view of the husking-shafts with ear-pullers and rubber coating, on an enlarged scale. Fig. 6, Sheet 2, is a plan view of a part of one of the stalk-feeders. Fig. 7, Sheet 2, is a bottom view of the same. Fig. 8, Sheet 3, is a plan view of the husking-trough with the discharging-spout, on an enlarged scale. Fig. 9, Sheet 3, is a vertical central section of the same with a portion of the rake in place, on a larger scale. Fig. 10, Sheet 3, is a vertical cross-section through the front part of the hopper at line $y\ y$, Fig. 1, Sheet 1, showing the rake in its most forward position, on an enlarged scale.

A, Figs. 1 and 2, is a forked tongue, which is attached to the hounds B' of the wagon, Fig. 1, in the ordinary way. This tongue A serves partly as a frame to attach the husking-machine to, and they extend backward and form the arms A', Figs. 1 and 2, which rest against the under surface of the axle-tree B, Fig. 1, and thus support the greater part of the weight of the machine and make it easy for the horses. D, Fig. 1, is an ordinary bolt, by which is attached the double-tree with the single-trees, to which the horses are hitched. C C, Figs. 1 and 2, are rings on the points of the tongue A to attach the horses' breast-strap to. E E, Figs. 1 and 2, are two arms diverging forward in such a manner as to gather, as the horses walk along, all the stalks that come within their range. F F, Figs. 1 and 2, are chains or straps attaching the gatherers E E to the front ends of the tongue A in order to give them the desired elevation from the ground. G G, Figs. 1 and 2, are levers fastened on the upper part of the gatherers E, and are intended to keep them in an upright position when not used. H H', Figs. 1, 2, 6, and 7, are the stalk-feeders, which are moved alternately back and forth by the connecting-rods I and K, Figs. 1 and 2; and the latter are attached to the crank N, respectively to the eccentric L, Figs. 1 and 2. F', Figs. 6 and 7, is a movable hook, held in its place by a pivot and a spring, S'. The object of having this hook movable in the described way is to allow the stalks to pass behind this hook F' by pushing it back; after the stalk has passed, the hook F' is brought into its original place by the springs S', Figs. 6 and 7. In front of these hooks F' there are two, or any other convenient number of hooks, which are solid with the stalk-feeders H and H', Figs. 6 and 7. M M', Figs. 2 and 5, are the ear-pullers, and are the front ends of the husking-rollers. One has a right screw and the other a left screw-thread cut at its point in order to take firm hold of the stalks presented to them by the stalk-feeders H and H'. R and R' are the husking-rollers with the rubber coating. $t'\ t'$ are pins projecting slightly above the rubber coating, and are intended to lift at their respective places the ear from the respective shaft and press it against the other shaft, and thus cause the ear to be revolved and present another surface to the husking-rollers R R'. P and P', Figs. 5 and 2, are pinions fixed on the back ends of the husking-rollers. The pinion P' is driven by pinion P, and the latter by the gear S, Figs. 1, 2, and 5. $a\ a$, Figs. 1 and 2, is the receiving-hopper, to gather the ears after they have been separated from the stalks by passing between the ear-pullers M and M', Figs. 2 and 5. $b\ b$, Figs. 1 and 2, is the feeding-hopper, and consists of the two side pieces $b\ b$, with the shoulders $c\ c$ at their lower part. These side pieces $b\ b$ swing on hinges $e\ e$, and are kept firm by means of the solid stays $d\ d$, Figs. 1 and 10, and the springs $f\ f$, Figs. 1 and 10. The parts $g\ g$, Figs. 1 and 10, which support the hinges $e\ e$, again are suspended on the hinges $h\ h$, Figs. 1 and 10, and are kept firm by means of the springs $i\ i$. The object of fastening the two sides $b\ b$, Figs. 2 and 10, and the parts $g\ g$ by means of hinges and springs, is to allow the said pieces $b\ b$ an up-and-down movement, and thus, by means of the shoulders $c\ c$, Fig. 10, crowd the ears below these shoulders $c$ onto the husking-rollers, which, in revolving, pull off the husks from the ear. $k$ is a separating wall, and intended to prevent the stalks from passing from the ear-pullers M' M, Figs. 2 and 5, between the rubber-coated husking-rollers. V is a fly-wheel, to which is attached, by means of a crank-pin, the connecting-rod W, Figs. 1, 2, 3, and 4. $l$ is the cross-head of the rake, from which extends backward the rake-bar $m$, and in the center line of this rake-bar are located the spring-fingers $n$, $n'$, $n''$, and $n'''$, and to the front side of the cross-head $l$ are fastened the two rake-rods $q\ q$, Figs. 1, 2, 3, and 4, with the rake-hands $p\ p$ at their front ends. In these hands $p\ p$ move the rake-fingers $o\ o$, which are pressed inward by means of the springs $s\ s$ fastened on the rake-rods. At their outer ends these rake-fingers $o\ o$ are connected and form a loop, $u$, which catches when the rake moves forward over the rake-guides $r\ r$, Figs. 1, 2, 3, and 10, and in doing so are pulled outward far enough so as not to come in contact with the ears of corn that are lying on the husking-rollers. When the rake has completed its forward movement the loop $u$, Figs. 3 and 4, has arrived at the cuts $r'$, Figs. 3 and 4, and as at that place there is nothing that keeps the fingers $o\ o$ pulled outward, they close under the effect of the springs $s\ s$, and so take hold of the ears, and, as the rake makes its back movement, pull them over the husking-rollers out of the feeding-hopper $b$ into the hopper-trough U. The nose $z'$ strikes the bar T, Figs. 1 and 10, when the rake moves forward and lifts it up, and as this bar T is fastened to one of the feeding-hopper side pieces $b$, it lifts the latter at the same time, and keps it up until the nose $z'$ has reached the front end of the bar T, Fig. 1, and meets the slot 4 4; and as there is nothing now that supports the hopper side piece $b$, it makes a downward movement by means of the spring $i$. As soon as the nose $z'$ meets the slot 4 the nose $z$ on the other side of the rake meets the lower face of the piece $g$ and lifts this up, and lets it drop down again as soon as the rake has gone back far enough to clear it from the nose $z$, Fig. 10. U, Figs. 1, 8, and 9, is the husking-trough. Q, Q', and Q'' are springs fastened pairwise to the inside of the husking-trough U, which allow the ears to pass between them and prevent them from going back again. U' is the discharging-spout, and a continuation of the husking-trough U, only closed at the bottom. V' is the regulator, and it is adjusted by moving it forward or backward, and kept in its desired place by the pin W', Fig. 8. C' Figs. 1 and 10, is the check-rein stay. $l'$, Fig. 2, is a hand-crank, and fastened to the end of the driving-shaft 2, upon which is fixed the driving-gear 3, which drives the small gear 5, upon the shaft of which are fastened the gear 8, on one side the crank N, and on the other side the fly-wheel V, with the crank L.

The man that operates the machine takes his stand on the right-hand front corner of the wagon, near the crank $l'$, Figs. 1 and 2. In starting the horses, the gatherers E E, Figs. 1 and 2, accumulate the stalks and concentrate them, so that they come between the stalk-feeders H and H', and, as the man turns the crank, these feeders are moved back and forth and the stalks are taken hold of by the feeder-hooks and gradually drawn into the hopper $a$, Fig. 2, at the bottom of which are the ear-pullers M M', Fig. 2. The right-and-left screws of the ear-pullers M M' take hold of the stalks very firmly, and by their rotation roll them out toward the ground and break the ears off, which accumulate in the receiving-hopper $a$ and feeding-hopper $b$, where they are crowded below the shoulders $c\ c$ onto the rubber-coated husking-rollers R and R', which, as they rotate, will take hold of the husks of the ears and pull them off. By the backward and forward movement of the rake the rake-fingers $o\ o$ take then the ears from underneath the receiving-hopper $b\ b$ into the husking-trough U. The spring-finger $n'''$, Fig. 9, then pulls the ear behind the ear-catcher Q'', from whence it is taken by the spring-finger $n''$ behind the ear-catcher Q', and at the succeeding backward movement of the rake the spring-finger $n'$ takes the ear and pulls it behind the ear-catcher Q into the discharging-spout U'. The spring-finger $n$ throws the ear into the wagon. The regulator V, Figs. 8 and 9, has for its object the regulation of the discharge of the ears to any part of the wagon in such a manner that if the ears are to be discharged into the front part of the wagon the regulator is set forward, so as to lift the spring-finger $n$ and prevent it from throwing the ear. If the ears are required to be discharged in the rear part of the wagon, the regulator V' is set clear back, so that the slide-piece of the spring-finger $n$ is not lifted at all, and then throws the ear with a certain force out of the spout by the back movement of the rake. The distance of throw is adjusted by the holes in the regulator. When an ear of corn passes the pins $t'\ t'$, Fig. 5, on the husking-rollers, these pins lift the ear for a moment from that husking-roller, and the so-increased pressure of the ear against the other husking-roller turns the ear so as to present the unhusked part of the ear to the husking-rollers.

Claims.

I claim as my invention—

1. The gatherers E E, with the supporting-levers G G, in combination with the adjusting chains or straps F F, as and for the purpose described.

2. The combination of the stalk-feeders H H' with their movable fingers F' and the springs S', as and for the purpose set forth.

3. The separating-wall $k$ between the pulling and husking rollers, as and for the purpose set forth.

4. The feeding-hopper, consisting of the side pieces $b\ b$, with their shoulders $c$, in combination with the rigid stays $d\ d$, springs $f\ f$, rods $g\ g$, springs $i\ i$, bar T having slot 4, as and for the purpose set forth.

5. The rake, consisting of the head $l$ and connecting-rod W, in combination with the rake-bar $m$, spring-fingers $n$, $n'$, $n''$, and $n'''$, rake-rods $q\ q$, rake-hands $p\ p$, rake-fingers $o\ o$, loop $u$, springs $s\ s$, and noses $z\ z'$, substantially as described.

6. The husking-trough U, with the ear-catchers Q, Q', and Q''.

7. The regulator V', in combination with the discharging-spout U'.

THOMAS F. VINCENT.

Witnesses:
   W. OTTE GRONEN,
   ISAAC L. DAVENPORT.